United States Patent
Kantor et al.

(10) Patent No.: US 10,366,257 B1
(45) Date of Patent: Jul. 30, 2019

(54) RFID TAG SINGULATION IN DENSE RFID ENVIRONMENTS

(71) Applicant: Amazon Technologies, Inc., Seattle, WA (US)

(72) Inventors: Oleg Kantor, Kirkland, WA (US); Tak Keung Joseph Lui, Bellevue, WA (US); David Bruce McCalib, Jr., Seattle, WA (US); Roman Shmulevich, Woodbridge (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/871,395

(22) Filed: Jan. 15, 2018

(51) Int. Cl.
G06K 7/10 (2006.01)
G06Q 10/08 (2012.01)

(52) U.S. Cl.
CPC ..... G06K 7/10099 (2013.01); G06K 7/10475 (2013.01); G06Q 10/087 (2013.01)

(58) Field of Classification Search
CPC .......... G06K 7/10099; G06K 7/10475; G06K 2017/0051; G06K 2017/0045; G06Q 10/087
See application file for complete search history.

(56) References Cited

U.S. PATENT DOCUMENTS

| | | | | |
|---|---|---|---|---|
| 6,888,459 B2 * | 5/2005 | Stilp | ................... | G07C 9/00103 340/10.1 |
| 7,408,466 B2 * | 8/2008 | Diorio | .................. | G06K 7/0008 340/572.1 |
| 9,722,715 B2 * | 8/2017 | Nair | ........................ | H04B 17/27 |
| 9,734,368 B1 * | 8/2017 | Kantor | .................. | G01S 13/878 |
| 9,807,646 B1 * | 10/2017 | Jorgavanovic | ............ | H04L 1/00 |
| 9,892,353 B1 * | 2/2018 | Lui | ..................... | G06K 17/0022 |
| 2005/0280538 A1 * | 12/2005 | Kawai | ........................ | G01S 3/74 340/572.1 |
| 2010/0066531 A1 * | 3/2010 | Karr | ........................ | G06Q 10/00 340/539.1 |
| 2010/0188211 A1 * | 7/2010 | Brommer | ................ | G06K 17/00 340/539.32 |
| 2014/0347165 A1 * | 11/2014 | Bremer | ............... | G06K 7/10217 340/10.1 |
| 2017/0063476 A1 * | 3/2017 | Nair | ........................ | H04B 17/27 |
| 2017/0228688 A1 * | 8/2017 | Bourlon | ............... | G06Q 10/087 |
| 2017/0276768 A1 * | 9/2017 | Wulff | .................... | G06Q 10/087 |
| 2018/0107969 A1 * | 4/2018 | Trivelpiece | ........... | G06Q 10/087 |

* cited by examiner

*Primary Examiner* — Brian E Miller
(74) *Attorney, Agent, or Firm* — Patterson + Sheridan, LLP (57) ABSTRACT

The embodiments herein measure the tag to noise ratio (TNR) for a tag on an item (e.g., a package) to determine a location of the item in a warehouse. In one embodiment, the TNR is derived by comparing a measured performance parameter for a tag of interest to the combined measured performance parameters for other tags measured by the same reader or for the same tag when measured by a different RFID reader. The higher the TNR, the greater likelihood the tag is within an area assigned to the reader. In another embodiment, the TNR is derived from comparing the signal strength of a tag as measured by multiple RFID readers. In another example, respective TNR values for a plurality of tags detected by a reader can be compared to determine which tag is being carried by an associate.

20 Claims, 6 Drawing Sheets

RFID TAG SINGULATION IN DENSE RFID ENVIRONMENTS

BACKGROUND

The present invention relates to determining a tag to noise ratio (TNR) for radio frequency identification (RFID) tags.

Shipping packages typically involves moving the packages to different locations in a shipping warehouse in preparation for the packages being loaded onto trucks. Shipping warehouses can use RFID systems to track inventory. RFID tags, which can be passive or active, are disposed on the inventory (e.g., individual packages or pallets) in the warehouse and are programmed with information identifying the associated inventory. The identifying information is read from the RFID tags by RFID readers. In one example, the RFID readers are located at loading docks or along conveyor belts so that the RFID system can detect when RFID tags (and the corresponding inventory) pass through.

However, in noisy or dense RFID environments (e.g., environments with large populations of RFID tags or a high density of RFID readers), a package can be detected by multiple RFID readers which are assigned to different locations in the warehouse. For example, during a first time instance, an RFID tagged package located in a loading zone for a first dock door may be detected by the RFID reader at that location. However, as the environment changes, during a second time instance the RFID tagged package may be detected by a RFID reader at a neighboring dock door. In response, an inventory tracking system may mistakenly determine the package has been moved to a different dock door (e.g., a false positive) and dispatch an associate to move the package back to the loading zone for the first dock door when in fact the package is stationary and has not changed dock door locations. As such, these false positives can generate false troubleshooting events which unnecessarily add to the workload of the associates in the warehouse.

The inventory tracking system can compare different metrics to identify the location of the tagged package when detected by multiple readers. For example, the tracking system can compare the instantaneous or average signal strength of signals received from the tag at the readers. In other examples, the system may compare the peak signal strength or the number of times the tag was detected by the readers. However, in a dense and noisy RFID environment, these factors may be insufficient to accurately determine the location of tagged packages.

BRIEF DESCRIPTION OF DRAWINGS

Various embodiments in accordance with the present disclosure will be described with reference to the drawings, where like designations denote like elements.

DETAILED DESCRIPTION

The embodiments herein measure the TNR for a tag on an item (e.g., a package) to determine a location of the item in a warehouse. That is, the TNR can be used to perform tag singulation which is the process an RFID reader uses to identify a tag with a specific serial number from a number of tags in its read region and to determine the location of the tag. In one embodiment, the TNR is derived by comparing a performance parameter for a tag of interest to the combined performance parameters for other tags as measured by the same RFID reader that detects the tag of interest, or for the same tag as measured by a different RFID reader. Stated differently, the TNR treats the performance parameter of the other tags measured by the same reader, or the performance parameter of the same tag as measured by a different reader, as noise. For example, if the performance parameter is the signal strength of the signals received from the tags, the TNR compares the average signal strength of the signals received from the tag of interest to the combined average signal strength of the signals received from the other tags detected by the reader. The higher the TNR, the greater likelihood the tag is within an area assigned to the reader. In another embodiment, the TNR can be derived from comparing the signal strength of a tag as measured by multiple RFID readers. In this example, the TNR can be derived by comparing the average signal strength of the signals received from the tag of interest as measured by one of the readers to the combined average signal strength of the signals received from the tag of interest as measured by the other readers.

The TNR can be used to determine a location of the tagged item in the warehouse such as a dock door location or if the tagged item has been picked up by an associate (i.e., a worker). For example, if multiple readers detect the same tag, an inventory tracking system may derive and compare TNR values of the tag for each of the readers. The inventory tracking system selects the reader that has the highest TNR value as the location of the tag. In another example, an associate may use a wearable reader to pick up an RFID tagged item (i.e., a pick up event) from among a plurality of tagged items. Because the individual signal strengths of the signals received from the tagged items may be similar, the inventory tracking system can use TNR values for each of the tagged items to determine which tagged item has been picked up by the associate.

Figure 1:
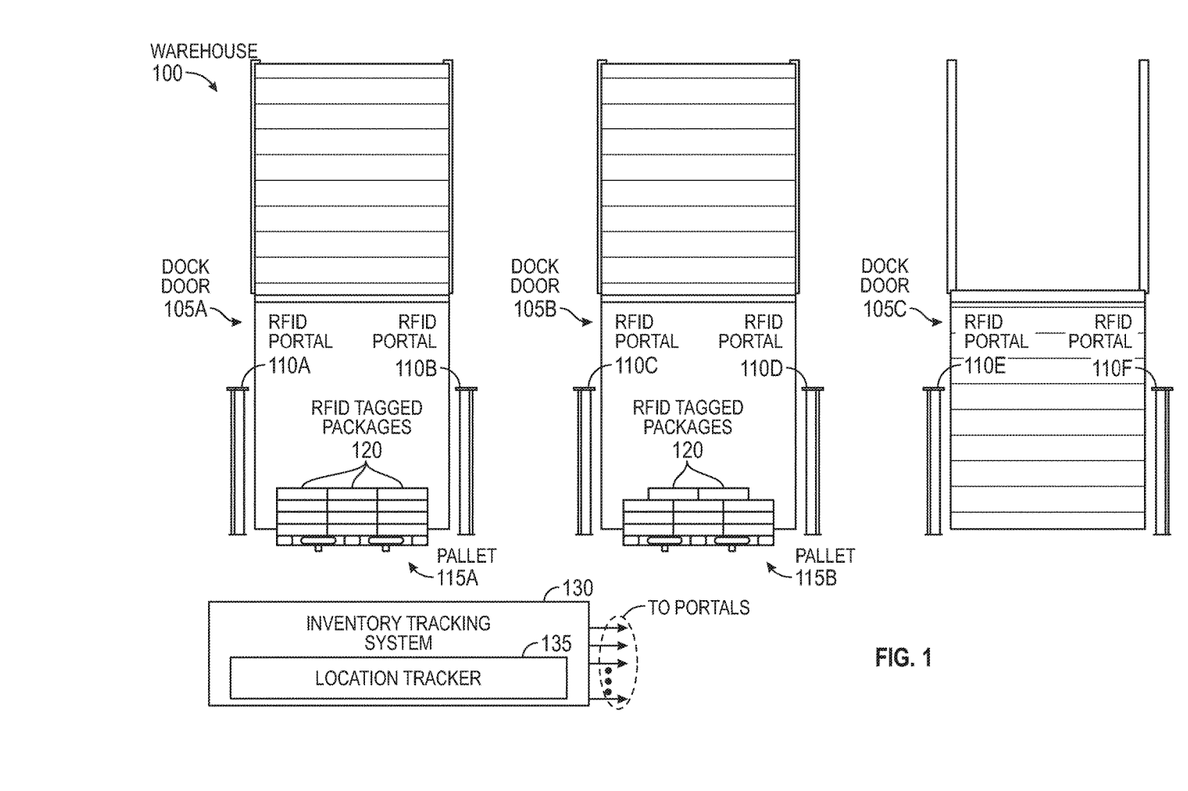
FIG. 1 is a warehouse with a plurality of dock doors with corresponding RFID portals, according to various embodiments.

FIG. 1 is a warehouse 100 with a plurality of dock doors 105 with corresponding RFID portals 110, according to various embodiments. As shown, each dock door 105 has a pair of RFID portals 110 which detect RFID tagged packages 120 in a loading zone in front of the dock door 105. Although in this embodiment, the RFID tags are disposed on each of the packages 120, in other examples, the pallets 115 may have a RFID tag, or the items inside of the packages 120 may have RFID tags.

The RFID portals 110 each include at least one RFID reader and antenna for detecting RFID tags on the packages 120. For example, an associate may move the pallet into the loading zone in front of the dock door 105 which is within wireless range of the RFID antenna and readers in the portals 110. As such, the RFID reader can receive unique IDs from the RFID tagged package 120 which can be used to track the packages 120 as they move throughout the warehouse 100. In one embodiment, the RFID portals 110 forward the unique IDs to an inventory tracking system 130 that includes a location tracker 135 which maps the unique IDs to items in the packages 120 to identify the current location of the packages 120 in the warehouse 100. Moreover, the location tracker 135 can compare the current locations of the packages 120 as reported by the RFID portals 110 to a desired location of the packages 120. For example, the RFID tagged packages 120 in the pallet 115A are in front of the dock door 105A, and thus, are detected by the RFID portals 110A and 110B. However, the location tracker 135 may determine that the associate should have moved the pallet 115 in front of the dock door 105C. As such, the location tracker 135 can provide feedback to the associate to move the pallet 115A from the loading zone in front of the dock door 105A to the loading zone for the dock door 105C.

As packages 120 are brought into the loading zone, they pass between a pair of the RFID portals 110 and are detected by their RFID readers. In another embodiment, instead of using a pair of portals 110 for each dock door 105, an RFID portal having an antenna facing towards the loading zone may be disposed on the wall next to the dock doors 105. In another example, an RFID portal may be disposed over the loading zone with an antenna that faces down towards the floor of the warehouse 100. In any case, the RFID readers in the portals can detect the RFID tags as the packages 120 are moved in front of the dock doors 105.

Because the packages 120 and pallets 115 may be stationary, the RFID portals 110 can continue to detect the RFID tags when performing additional read cycles. That is, the RFID portals 110 may continue to inform the location tracker 135 when they detect the RFID tags in subsequent read cycles. As shown, the dock doors 105 and the RFID portals 110 are in close proximity. For example, the RFID portal 110B may be only a few feet away from the RFID portal 110C. As such, the read regions of the portals 110 (e.g., the area in which the RFID reader in an RFID portal can detect a tag) may extend into neighboring loading zones. Moreover, the extent to which the read regions extend into neighboring loading zones can change depending on environmental factors. For example, a hand truck moving from the dock door 105B to the dock door 105A may reflect or interfere with the read region of the RFID portal 110 such that its read region extends into the loading zone for the dock door 105B. Similarly, the read region for the RFID portal 110D may temporarily extend into the loading zone for the dock door 105A. Thus, during one read cycle, the RFID portal 110D may detect an RFID tag on the pallet 115B or the RFID portal 110D may detect a tag on the pallet 115A.

Because of the noisy and high density RFID environment in the warehouse 100, the location tracker 135 may mistakenly determine that a package 120 is in the wrong loading zone. For example, when moving the pallet 115A into a loading zone, the environmental conditions in the loading zone may result in the RFID portals 110C and 110D at dock door 105B as well as the RFID portals 110A and 110B at the dock door 105A detecting the RFID tagged packages 120 on the pallet 115A. As such, because multiple portals 110 assigned to different locations (e.g., different dock doors or loading zones) detect the same tag, the location tracker 135 may be unable to determine the correct location of the tagged packages 120. The location tracker 135 may determine the location of the package 120 corresponds to the portal 110 that first detected the package 120, but if the portals 110C or 110D were the first to detect the packages 120, the location tracker 135 will incorrectly determine the packages 120 are located at dock door 105B. Assuming the desired destination for the pallet 115A is the dock door 105A, the location tracker 135 may dispatch an associate to move the pallet 115A to the dock door 105A. However, when arriving at the loading zone, the associate determines that the pallet 115A is already at the correct destination—i.e., the dock door 105A. Thus, because of the high density of RFID readers in the loading zone, as well as the noisy and dynamic nature of the environment, the RFID readers can detect stationary or transient RFID tagged packages 120 which are physically located in different locations than the locations assigned to the reader.

In one embodiment, the location tracker 135 determines TNR values for the tagged packages 120 to determine a location of the RFID tagged packages 120 in the loading area—e.g., the area near the dock doors 105. That is, instead of relying on the first RFID event to determine where the RFID tagged packages 120 are located, the location tracker 135 may use the TNR values to determine the location of the packages 120. In one embodiment, the TNR is calculated by comparing a measured parameter derived from the signal received from a tag of interest to the combination of the same measured parameter derived from the signals received from the other tags. Put differently, the measured parameters from the other tags are treated like noise much like environmental noise used when calculating a signal to noise ratio (SNR). The TNR represents how much the measured parameter (e.g., average signal strength, normalized signal strength, electrical angle, and the like) of the tag of interest differs from the "noise"—i.e., the combined measured parameters of the other tags read by the same reader.

In another embodiment, instead of comparing the measured parameter of one tag to the combined measured parameters of other tags, the TNR is derived by comparing a parameter measured by a first RFID portal 110 (or RFID reader) for a tag of interest to the parameter measured by one or more other RFID portals 110 for the same tag. For example, three of the portals 110 (e.g., the RFID portal 110A, 110D, and 110F) may detect the same tagged package 120. As described in more detail below, the location tracker 135 can calculate a TNR value for each of the portals 110A, 110D, and 110F by comparing the, e.g., the average signal strength of the signal received from the tagged package 120 at each of the portals to the combined average signal strength of the signals received from the tagged package 120 at the other portals.

In addition to using TNR values to determine locations of RFID tagged packages 120 at dock doors or loading zones, in other embodiments, the RFID readers are disposed at a pallet storing zone where pallets are placed in different designated areas. For example, the floor of the warehouse may be marked using paint or tape to indicate a boundary of the pallet storing areas. An RFID portal or reader may be disposed at each of the pallet storing areas to identify the tagged packages on a pallet placed in the corresponding area. Like in the loading zones shown in FIG. 1, the pallet storing areas may be disposed close together (e.g., a foot or less) which means the RFID reader may detect packages in neighboring pallet storing areas. As such, multiple readers may detect the same tagged package which makes it difficult for the location tracker 135 to determine which of the corresponding pallet storing areas has the package. Stated generally, the TNR value can be used in any location in the warehouse 100 that has a high density of readers where multiple readers, which are assigned to different zones or areas, detect the same package.

Figure 2:
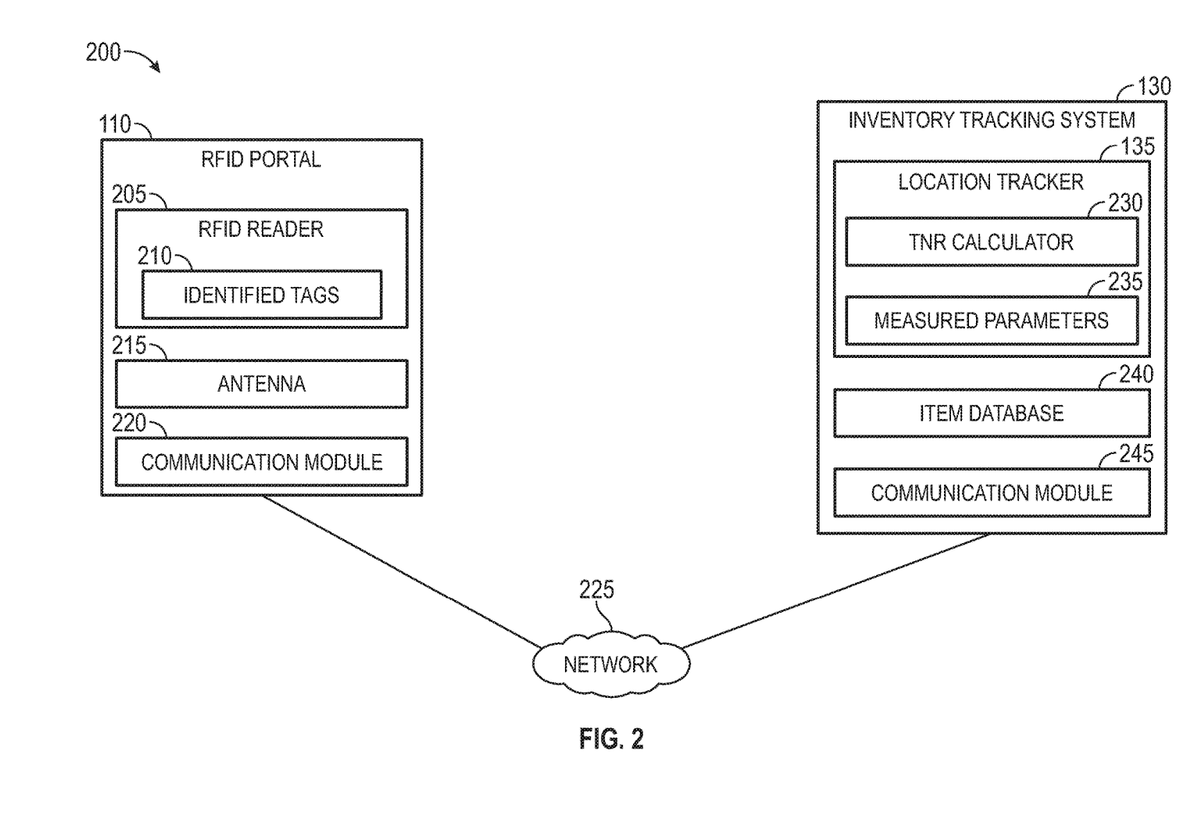
FIG. 2 is a block diagram of a system for tracking RFID tagged packages in a warehouse, according to various embodiments.

FIG. 2 is a block diagram of a system for tracking RFID tagged packages in a warehouse, according to various embodiments. The system includes the RFID portal 110, the inventory tracking system 130, and a network 225. The RFID portal 110 includes an RFID reader 205, an antenna 215, and a communication module 220. The RFID reader 205 can use the antenna 215 to transmit and receive RFID signals from RFID tags (not shown) on the packages in the warehouse. Although one antenna 215 and RFID reader 205 is shown, the RFID portal 110 can include any number of antennas 215 and readers 205. For example, the RFID portal 110 may include one reader 205 coupled to multiple antennas 215, or multiple readers 205 that are each coupled to a respective antenna 215. For example, one antenna 215 may be arranged to detect RFID tagged packages near the portal 110 while another antenna 215 in the same portal 110 is arranged to detect RFID tagged packages further away from the portal 110.

The communication module 220 transmits tags 210 identified by the RFID reader 205 to the inventory tracking system 130 via the network 225. The communication module 220 may have a wired or wireless connection to the network 225. The network 225 can be a local area network (LAN) or a wide access network (WAN) such as the Internet. For example, the inventory tracking system 130 can be hosted by a computing system (which includes one or more processors and memory) in the same warehouse as the RFID portal 110 or in a remote data center. For example, the inventory tracking system 130 can be an application or service that is hosted in a cloud computing environment which communicates with the RFID portal 110 using the network 225.

The inventory tracking system 130 includes the location tracker 135 (e.g., a software application), an item database 240, and a communication module 245. The location tracker 135 includes a TNR calculator 230 and measured parameters 235. In one embodiment, the TNR calculator 230 receives the identified tags 210 and the measured parameters 235 from the RFID reader 205. The measured parameters 235 can be any parameter derived from signals received by the RFID reader 205 from the tags such as signal strength (e.g., received signal strength indication (RSSI)) or an electrical angle. In some embodiments, the TNR calculator 230 alters the measured parameters when calculating a TNR value such as averaging the signal strength over a predefined period of time or normalizing the signal strength using a maximum received signal strength.

In one embodiment, the TNR calculator 230 derives a TNR value using the following equation:

$$TNR_i = \frac{\text{Average Signal Strength of Tag of Interest}}{\text{Combined Average Signal Strength}} \quad (1)$$

The numerator of Equation 1 represents the average signal strength of the tag of interest during a predefined time period while the denominator represents the combined average signal strength of the other tags detected by the reader, or the combined average signal strength when the tag of interest is detected by other readers. Although the Equation 1 (and the embodiments the follow) describe using the average signal strength of the signals received from the tags to derive the TNR, other measured parameters 235 can be used instead, such as the normalized signal strength or the electrical angle derived from RSSI measurements (e.g., I and Q values) provided by the RFID reader 205.

Equation 1 can be further expressed as:

$$TNR_i = \frac{\left(\sum_{t'=0}^{t'=K} RSSI_{t'}\right)}{\frac{K}{\left(\sum_{t=0}^{t=N} RSSI_t - \sum_{t'=0}^{t'=K} RSSI_{t'}\right)}} \quad (2)$$

In Equation 2, RSSI' is the signal strength for the tag of interest (t'), RSSI is the signal strength for all the tags (t) or the signal strength of the tag of interest when detected by other readers, K is the number of read events for the tag of interest (t') during a predefined time period, and N is the total number of read events for all the tags or readers during the same predefined time period. Like in Equation 1, the numerator of Equation 2 (i.e., the top half of Equation 2) represents the summation of the signal strength (RSSI') which is divided by the number of read events (K) for the tag of interest to result in the average signal strength (i.e., average RSSI') corresponding to the tag of interest during the predefined time period. Stated differently, the numerator of Equation 2 sums the RSSI of the signals received each time a read event for the tag of interest occurs during the predefined time period. A "read event" occurs when an RFID reader detects the tag during a read cycle. For example, during the predefined time period, the reader 205 may perform ten read cycles but detect the tag of interest only five of those ten cycles. In this example, the number of read events (K) for the tag of interest is five. During the same time period, the reader may detect one read event for a second tagged package, six read events for a third tagged package, and two read events for a fourth tagged package. Thus, the total number of read events (N) for all the tags during the time period is fourteen.

The denominator of Equation 2 (i.e., the bottom half of Equation 2) determines the average signal strength of the tags excluding the average signal strength of the tag of interest. That is, in one embodiment, the denominator sums up the RSSI values for all of the tags read by the reader and subtracts the summation of the RSSI values for the tag of interest as measured by the same reader used to calculate the numerator of Equation 2. This subtraction is divided by N–K which is the number of read events attributable to the other tags. As such, the value of the denominator represents the combined average RSSI of the other tags detected by the reader, excluding the tag of interest.

In another embodiment, instead of summing up the average RSSI values for other tags detected by the same reader, the denominator is determine by summing up the average RSSI values measured by other readers for the same tag— i.e., the tag of interest. That is, the average RSSI values for the tag of interest as measured by one reader (i.e., the same reader used to generate the average RSSI for the numerator) is subtracted from the average RSSI values for the tag of interest as measured by all the readers. This results in the combined average RSSI of the tag of interest for the read events measure by the other readers when divided by N–K. Stated differently, in this example, the value of the denominator represents the combined average RSSI of the tag of interest as measured by other readers (excluding the RSSI values measured by the reader used to calculate the numerator). Using Equation 2, the TNR calculator 230 can calculate a TNR value for a tag of interest which can then be used to determine a location of a tag in a warehouse or correlate the tag to a pick up event. For example, using the TNR values generated by the TNR calculator 230, the location tracker 135 can update the location of the packages saved in the item database 240 to indicate the particular loading zone or pallet area that contains the package 120 or that an associate has picked up the package 120.

The communication module 245 can have a wired or wireless connection to the network 225. The communication module 245 permits the inventory tracking system 130 to communicate via the network 25 with the RFID portals 110 in the warehouse which may be scattered among different areas, or at least the areas which have RFID tagged items or packages. Further, the communication module 245 may wirelessly communicate with wearable RFID readers which can be transported around the warehouse as an associate retrieves and sorts tagged packages.

Figure 3:
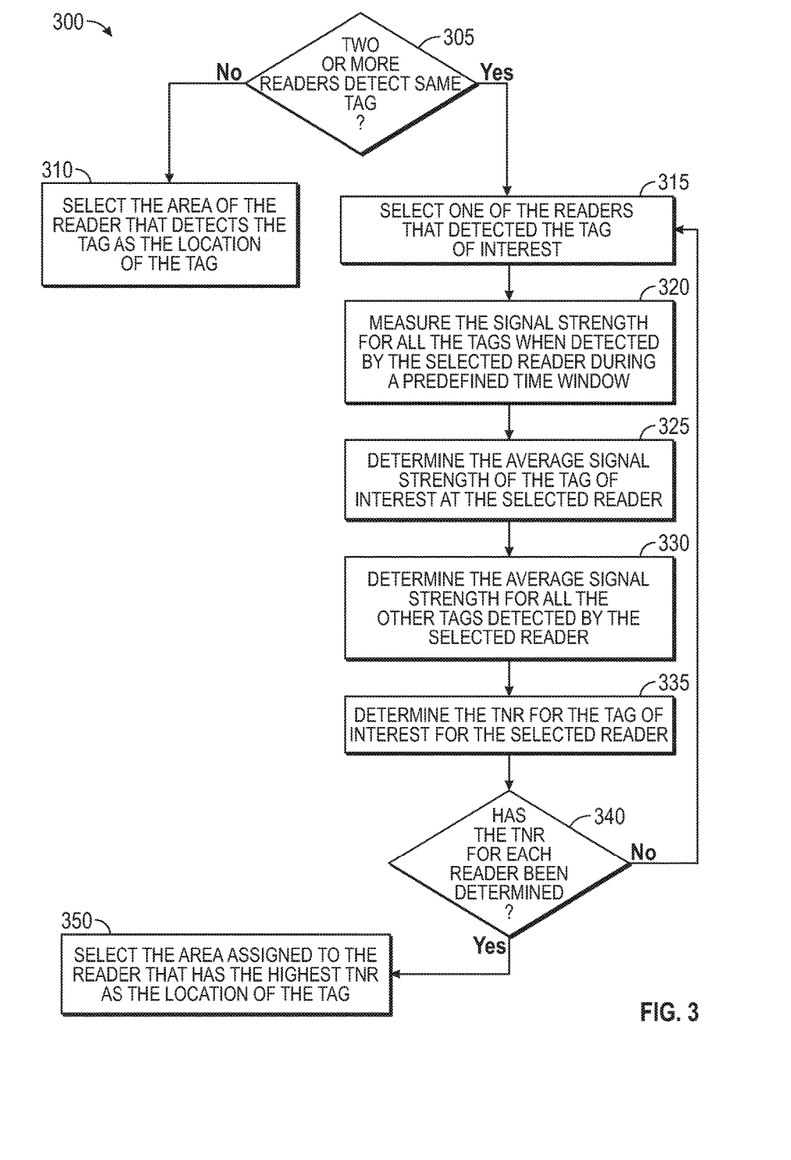
FIG. 3 is a flowchart for tracking RFID tagged packages in a warehouse, according to various embodiments.

FIG. 3 is a flowchart of a method 300 for tracking RFID tagged packages in a warehouse, according to various embodiments. At block 305, the location tracker determines whether two or more readers detect the same tag. For example, the two readers may be assigned to detect RFID tags in the loading zones for two different dock doors, or two different pallet storing areas. Ideally, the readers only detect tags that are within their assigned physical locations. However, the beam patterns of the readers are difficult to configure to match the dimensions of the physical locations. Further, as mentioned above, a dynamic environment in a warehouse can cause the read regions of the readers—i.e., the regions or volumes where the readers can detect a tag—to change. As such, the same tag may be detected by different RFID readers.

In one embodiment, the method 300 is triggered when a new tag enters the read region of one of the readers. For example, the location tracker may evaluate the list of IDs provided by the readers to determine if an ID that was not on a previous list was received. If so, the location tracker can use the method 300 to determine the location of the tag when multiple readers detect the same new tag. That is, when entering a zone or location of the warehouse with a high density of RFID readers, the new tag may be detected by multiple readers at, or around, the same time.

However, if the tag is detected by only one RFID reader, the method 300 proceeds to block 310 where the location tracker selects the area of the reader that detected the tag as the location of the tag. Stated differently, the location of the tag is assigned to the zone or area assigned to the reader that detected the tag. The location tracker can then update the item database to indicate the new location of the tag (and the corresponding package).

If the tag of interest is detected by multiple RFID readers, the method 300 instead proceeds to block 315 where the location tracker selects one of the readers that detected the tag of interest. At block 320, the location tracker measures the signal strength for all the tags detected by the selected reader during a predefined time window. In one embodiment, the selected reader provides RSSI values for all the tags detected during each read cycle. That is, whenever there is a read event where the reader detects a tag, the tag provides the RSSI value corresponding to that read event to the location tracker. The location tacker collects these RSSI values over the predefined time period (e.g., a second). For example, the selected reader may perform ten read cycles and detect the tag of interest six times (i.e., six read events), a second tag three times (three read events), and a third tag seven times (seven read events). The location tracker stores or derives the signal strength or RSSI values for all the read events for all of the tags detected by the selected reader during the predefined time period.

At block 325, the TNR calculator determines the average signal strength for the tag of interest during the predefined time period. Continuing the previous example, the TNR calculator generates the average RSSI from the six RSSI values corresponding to the six read events detected by the reader for the tag of interest. In one embodiment, the TNR calculator can derive the average signal strength for the tag of interest using the mathematical expression shown in the numerator of Equation 2 above. Although the method 300 describes using the average RSSI values, any other measured parameter described above can be used.

At block 330, the TNR calculator determines the average signal strength (e.g., average RSSI) for the other tags detected by the selected reader during the predefined time period. In one embodiment, the TNR calculator derives the average signal strength for all the other tags detected by the reader using the mathematical expression in the denominator of Equation 2 above. That is, the TNR calculator can subtract the average RSSI for the tag of interest from the average RSSI for all the tags which yields the average signal strength for all other tags detected by the selected reader during the predefined time period.

At block 335, the TNR calculator determines the TNR for the tag of interest for the selected reader. In one embodiment, the TNR calculator divides the average signal strength of the tag of interest identified at block 325 by the average signal strength for the other tags detected by the selected reader as shown in Equation 2. This yields a TNR value that compares the signal strength of the tag of interest to the "noise" in the environment—e.g., the combined average signal strength of the remaining tags detected by the selected reader.

At block 340, the location tracker determines whether the TNR calculator has determined a TNR value for each of the readers that detected the tag of interest. If not, the method 300 returns to block 315 where the location tracker selects another of the readers and repeats blocks 320-335 for the signal strengths measured by that reader. This portion of the method 300 repeats until the TNR calculator has determined a TNR value corresponding to the tag of interest for each of the readers that detected the tag at block 305.

Once all the TNR values are determined, the method 300 proceeds to block 350 where the location tracker selects the area of the reader that has the highest TNR value as the location of the tag. Put differently, the location tracker compares the TNR values for the tag of interest corresponding to each reader to see which reader has the highest TNR value. Generally, a higher TNR value indicates that the average signal strength of the tag of interest is higher than the average signal strength of the other tags detected by the reader. This indicates that the tag is more likely within the location assigned to the reader. Thus, by comparing the TNR values and selecting the highest TNR value, the location tracker chooses the reader where the tag has the highest signal strength compared to the other tags detected by the reader. In response, the location tracker updates the item database to indicate that the tagged package is located at the same location of the reader with the highest TNR value.

Although the method 300 can be used independently to determine a location of a package when detected by multiple readers, the method 300 can also be used as only one factor to determine the location of the package. For example, the location tracker can compare the RSSI values to a minimum threshold in addition to comparing the TNR values. In another example, the location tracker can compare the instantaneous signal strength for each read event between the readers. The location tracker can then assign different weights to these factors to determine the location of the package. In this way, the TNR value can be one factor of several that are evaluated before selecting a location of the package.

Figure 4:
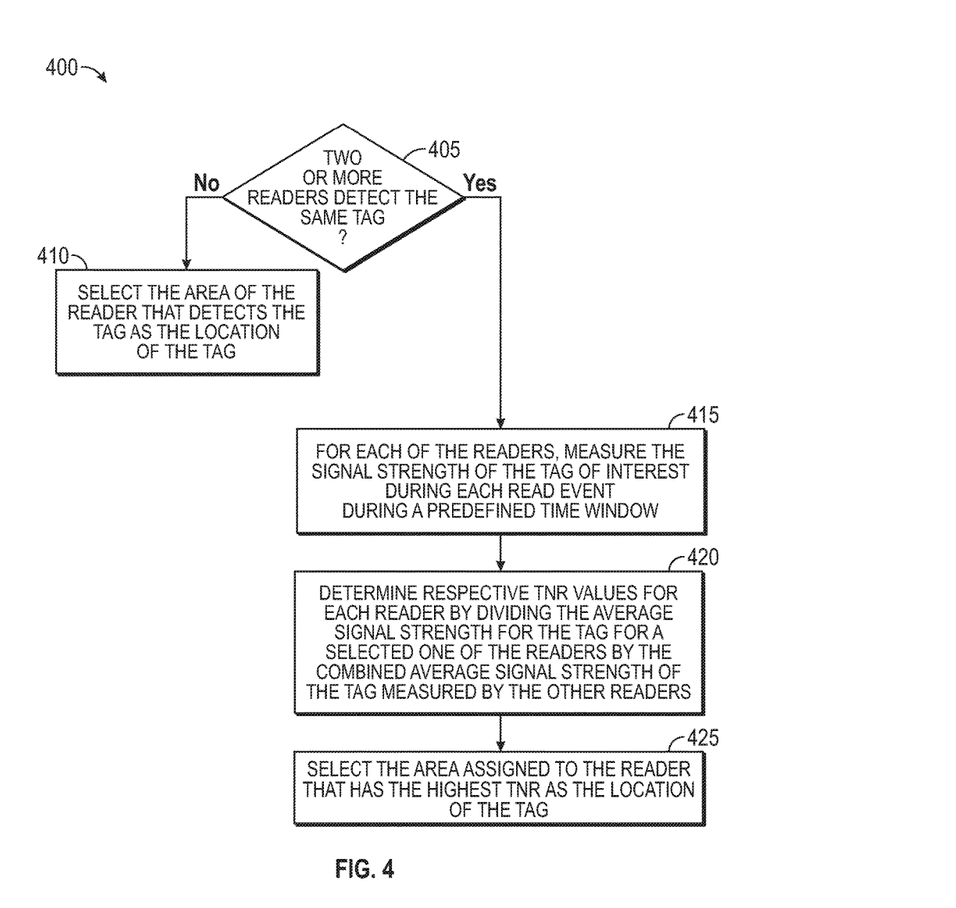
FIG. 4 is a flowchart for tracking RFID tagged packages in a warehouse, according to various embodiments.

FIG. 4 is a flowchart of a method 400 for tracking RFID tagged packages in a warehouse, according to various embodiments. At block 405, the location tracker determines whether two or more readers detect the same tag. Like in block 305 of the method 300, the two readers may be assigned to detect RFID tags in the loading zones for two different dock door, or two different pallet storing areas which are proximate to each other. The beam patterns of the readers are difficult to configure to match the dimensions of the physical locations. Further, as mentioned above, a dynamic environment in a warehouse can cause the read regions of the readers—i.e., the regions or volumes where the readers can detect a tag—to change and detect tags disposed in a location assigned to a different reader.

However, if the tag is detected by only one RFID reader, the method 400 proceeds to block 410 where the location tracker selects the area of the reader that detected the tag as the location of the tag. Stated differently, the location of the tag is assigned to the zone or area assigned to the reader that detected the tag. The location tracker can then update the item database to indicate the new location of the tag (and the corresponding package).

If the tag of interest is detected by multiple RFID readers, the method 400 instead proceeds to block 415 where, for each of the readers that detected the tag of interest, the location tracker measures the signal strength of the tag of interest during each read event during a predefined time window. For example, a first RFID reader may detect the tag of interest three times (e.g., three read events) during the predefined time period, a second RFID reader detects the tag of interest six times (six read events) during the same time period, and a third RFID reader detects the tag of interest twice (two read events) during the same time period. The location tracker can store the RSSI measurements corresponding to each of the read events for each reader (i.e., eleven total read events).

At block 420, the TNR calculator determines respective TNR values for each reader by dividing the average signal strength of the tag of interest for a selected one of the readers by the combined average signal strength of the tag of interest measured by the other readers. Continuing the previous example, to determine the TNR value of the tag of interest for the first RFID reader, the TNR calculator determines the average RSSI during the three read events for the first reader which is divided by the average combined RSSI during the eight read events for the second and third readers. To determine the TNR value of the tag of interest for the second RFID reader, the TNR calculator divides the average RSSI during the six read events detected by the second reader by the average combined RSSI during the five read events detected by the first and third readers. To determine the TNR value of the tag of interest for the third RFID reader, the TNR calculator divides the average RSSI during the two read events detected by the third reader by the average combined RSSI during the nine read events detected by the first and second readers. In this manner, the TNR calculator determines a TNR value for each of three readers which treats the signal strength of the tag of interest as measured by the other readers as noise.

At block 425, the location tracker selects the area of the reader that has the highest TNR value as the location of the tag. That is, the reader with the highest TNR value indicates that the measured signal strength of the tag of interest for that reader is the most different from the signal strength of the tag of interest as measured by the other readers. Thus, the tag is more likely to be closer to the reader that has the highest TNR value. Moreover, as mentioned above, the TNR value may be used as one of several factors for determining the location of the tagged package.

Figure 5A:
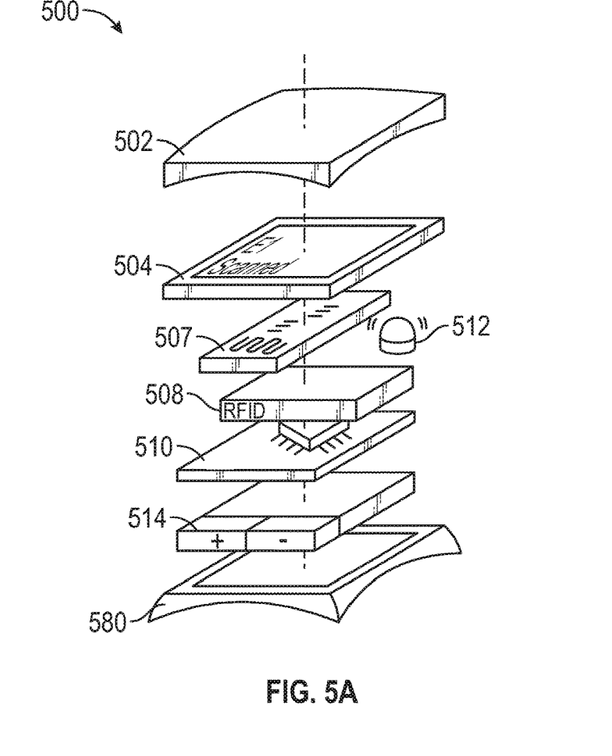
FIG. 5A is a pictorial diagram of an example wearable detector, according to various embodiments.

FIG. 5A is a pictorial diagram of an example wearable detector. The wearable detector 500 may include a top cover 502 and a bottom cover 580. When the top cover 502 joins with the bottom cover 580, an enclosed chamber may be formed. The enclosed chamber may include additional elements to allow the wearable detector 500 to read wireless identifiers (e.g., RFID tags or near-field communication (NFC) tags). The top cover 502 may be formed of a shock resistant material to protect the elements of the wearable detector 500.

As shown in FIG. 5A, the wearable detector 500 may include a display 504 which can be used as a feedback device. The display 504 may be implemented as a matrix display, light-emitting diode (LED) display, organic light-emitting diode (OLED) display, or other display component for presenting graphic information. The top cover 502 may be transparent or semi-transparent to allow viewing of information shown on the display 504.

The wearable detector 500 may include a wireless communication system 507. The wireless communication system 507 may include the hardware elements to allow the wearable detector 500 to transmit and receive wireless communications with other devices or systems such as the inventory tracking system 130 shown in FIG. 2. The wireless communication system 507 may include one or more of a BLUETOOTH compatible transceiver, a WI-FI compatible transceiver, a mesh radio transceiver, cellular transceiver, or other wireless transceiver.

A wireless scanning module 508 may also be included in the wearable detector 500. The wireless scanning module 508 may include hardware elements to allow the wearable detector 500 to read wireless identifiers such as RFID tags or NFC data. The wireless scanning module 508 may include a RFID transceiver/reader, NFC transceiver, or other wireless scanning transceiver. The wireless scanning module 508 may be dynamically tunable to allow the transceiver to send or receive specified frequencies. For example, the RFID transceiver may operate in a low frequency mode and a high frequency mode to scan different distances and/or types of RFID tags. In some implementations, separate low and high frequency transceivers may be included in the wireless scanning module. The wireless scanning module 508 may include one or more RFID readers.

The wearable detector 500 may include a microcontroller 510. The microcontroller 510 may coordinate the functions of the elements included in the wearable detector 500. For example, the microcontroller 510 may adjust the state of the wireless scanning module 508 (e.g., on/off, frequency, etc.). The microcontroller 510 may provide information for presentation via the display 504. For example, the microcontroller 510 may cause the display to present an output message upon activation of the wireless scanning module 508 or another element of the wearable detector 500. The message may indicate that the wireless scanning module 508 or other element of the wearable detector 500 has been activated. The message may include an identification of a wireless identifier successfully scanned. The microcontroller 510 may activate a location device (e.g., GPS receiver or RTLS tag in the wearable detector 500 (which are not shown in FIG. 5A)) to receive a current location for the wearable detector 500. The location information received may be used to activate and deactivate features of the wearable detector 500. For example, the type of wireless identifiers may be specific to a location or area within a warehouse. Accordingly, the wearable detector 500 may determine its location and selectively control the wireless scanning module 508 to scan for wireless identifiers located in the same area as the wearable detector 500. The types and locations of wireless identifiers may be specified in memory, a wireless scanning configuration, or retrieved via messaging such as from a management device.

In some implementations, the microcontroller 510 may provide information to other output devices included in the wearable detector 500. For example, the wearable detector 500 may include other feedback devices such as a vibrating motor. The vibrating motor 512 may be driven by messages transmitted from the microcontroller 510 to provide haptic feedback. The message may indicate one or more of a speed or a duration for driving the vibrating motor 512. Using different speeds and/or durations, haptic feedback patterns may be generated to provide different feedback messages. For example, a repetitive buzz may be associated with an error while a short, firm buzz may be associated with positive feedback. Other output devices that may be included in the wearable detector 500 and driven by the microcontroller 510 include audio output (e.g., sound or tone playback) or lighting elements (e.g., an LED that flashes different colors). The output device may include a heads-up display or other augmented reality device in communication with the microcontroller 510 and configured to present output based on messages received from the microcontroller 510.

The wearable detector 500 may include a power source such as a battery 514. The battery 514 may be a rechargeable battery. In some implementations, the battery 514 is inductively charged or is charged using an external power source (not shown) such as via an electric wire or solar cell.

The elements included between the top cover 502 and the bottom cover 580 may be coupled by a bus (not shown). The bus may be a data bus, communication bus, power bus, or other bus mechanism to enable the various components of the wearable detector 500 to exchange resources (e.g., power) and/or information.

Figure 5B:
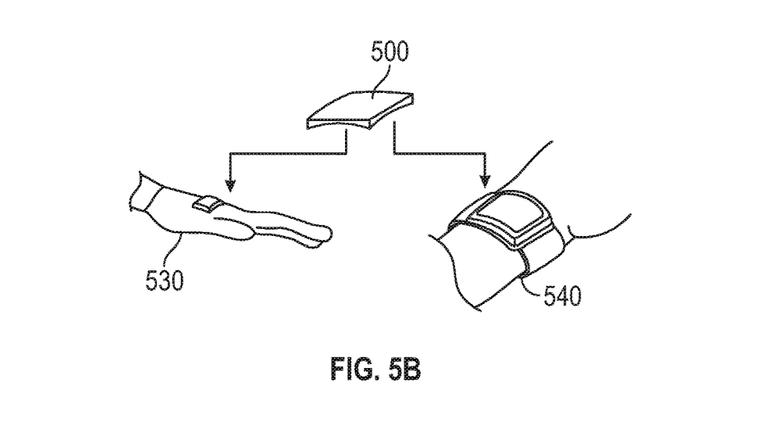
FIG. 5B is a pictorial diagram of example wearable items that may include the wearable detector of FIG. 5A, according to various embodiments.

FIG. 5B is a pictorial diagram of example wearable items that may include the wearable detector of FIG. 5A. FIG. 5B shows examples of the wearable detector 500 as mounted to a glove 530 and a bracelet 540. It will be understood that the wearable detector 500 can be integrated with other wearable items such as a hat, shirt, pants, or belt, to name a few. The wearable detector 500 may be integrated with another computing device such as a tablet computer, laptop computer, smartphone, or scanner. The wearable detector 500 may be included in non-human equipment such as a mobile drive unit. In such implementations, some feedback elements such as a display may be omitted.

The mounting of the wearable detector 500 on the glove 530 or the bracelet 540 may be a physical mounting. In such implementations, the wearable detector 500 is physically coupled with the wearable item. The physical coupling may include hook and loop attachment, a snap-in/snap-out attachment, an adhesive attachment, or other similar structural coupling. In some implementations, the wearable detector 500 may include conductive coupling with the wearable item. For example, if the fingertips of the glove 530 include passive switch terminals that are activated when the tips are brought together, the passive switch may be coupled with the wearable detector 500 to allow the wearable detector 500 to receive information from the switch. Another example conductive coupling may be with an antenna included in the glove 530 or the bracelet 540. Including an antenna in the wearable item that can be coupled with the wearable detector 500 can increase the ability of the wearable detector 500 to transmit and receive wireless signals. This may also allow individual users to use their own equipment such as a set of gloves or wristbands.

Whether associated with a human or a robotic entity, as the wearable detector 500 moves through the warehouse, the wearable detector 500 may activate the wireless scanning module 508 to detect wireless identifiers. The wireless scanning module 508 may identify a frequency to emit, transmit one or more signals of the identified frequency, and receive a response signal. The response signals may include information such as an item identifier or unique identifier for the wireless identifier that can be used to look up an item identifier such as from the inventory tracking system. Characteristics of the response signals may also be used to analyze the response signals. For example, the strength of the response signal may be used to generate a received signal strength indicator value for the response signal. The phase of the response signal may be another characteristic used for analysis. The response signals and/or characteristics of the response signals may be stored in memory, such as a memory coupled with the wireless scanning module 508 and/or the microcontroller 510. The stored information may be analyzed to accurately identify the location of items associated with the detected wireless indicators.

Figure 6:
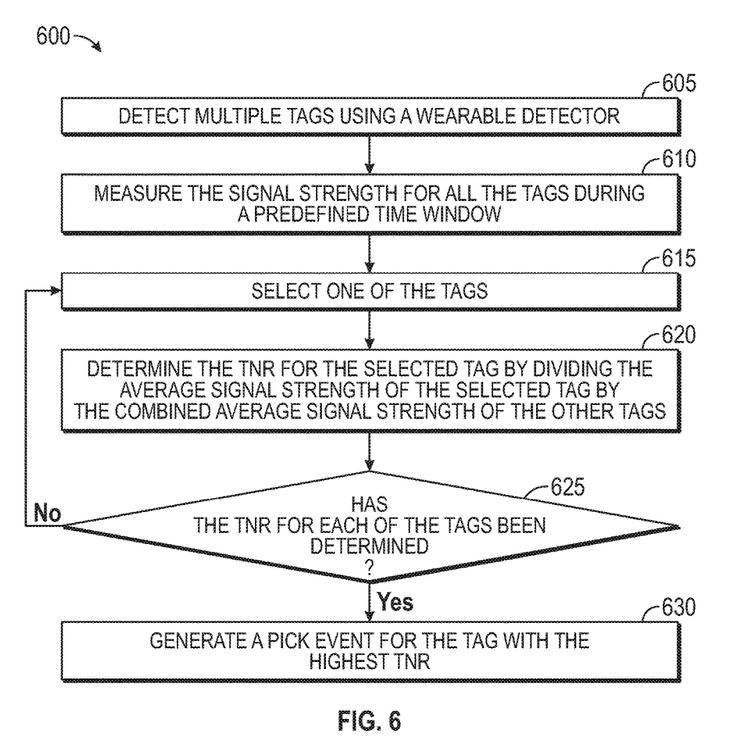
FIG. 6 is a flowchart for detecting a pick event using a wearable detector, according to various embodiments.

FIG. 6 is a flowchart of a method 600 for detecting a pick event using a wearable detector, according to various embodiments. In one embodiment, the method 600 is performed by the wearable detector 500 described in FIGS. 5A and 5B. For example, the microcontroller 510 in the wearable detector 500 can include a TNR calculator for determining TNR values corresponding to the tags read by the wireless scanning module 508 (e.g., an RFID transceiver or reader). However, in another embodiment, the wearable detector 500 may transmit the measured signal strength for the tags to the inventory tracking system which determines the TNR values for the tags.

At block 605, the wireless scanning module in the wearable detector detects multiple tags. For example, the associate wearing the detector may be reaching to retrieve an RFID tagged package that is in close proximity with multiple RFID tagged packages. The tagged packages may be disposed on the same pallet or lined up on a conveyor belt. As such, the read region of the wireless canning module may cover multiple packages which means the wearable detector cannot easily determine which package the associate has picked up, or is about to pick up.

At block 610, the wearable detector measures the signal strength for all the tags during a predefined time window. That is, the wearable detector may store the RSSI values each time the wireless scanning module detects a read event for one of the tags. Like in methods 300 and 400, the wearable detector may perform multiple read cycles during the predefined time period during which the detector can detect multiple read events for the tags. For example, the wearable detector may perform ten read cycles and detect five read events for a first tag, eight read events for a second tag, and seven read events for a third tag. The wearable detector can store the RSSI values measured during each of these twenty read events.

At block 615, the TNR calculator selects one of the tags. The order in which the tags are selected does not matter. At block 620, the TNR calculator determines a TNR value for the selected tag by dividing the average signal strength of the selected tag by the combined average signal strength of the other tags detected by the wearable device. In one embodiment, the TNR calculator uses Equation 2 to divide the average RSSI of the selected tag by the combined average RSSI of all the other tags detected by the wearable detector.

At block 620, the TNR calculator determines whether a TNR value for each of the tags has been determined. If not, the method 600 returns to block 615 where the TNR calculator selects a different tag which does not yet have a TNR value and repeats block 620. In this manner, the TNR calculator can derive a TNR value for each tag detected at block 605.

At block 625, the inventory tracking system generates a pick event for the tag with the highest TNR value for determining a location of the corresponding package. In one embodiment, the wearable detector selects the tag with the highest TNR value and reports the tag ID for that tag to the inventory tracking system as the package that was picked up (or is about to be picked up) by the associate. In turn, the inventory tracking system generates the pick up event indicating that the associate has retrieved the tagged package (e.g., the location of the package is the same as the location of the associate) and is moving it to a different location. In one embodiment, the inventory tracking system confirms that the associate has picked the correct package and then provides feedback to the associate using the wearable detector.

In this manner, the method 600 permits the wearable detector to identify which of a plurality of RFID tagged items or packages have been picked by the associate. In one embodiment, the wearable detector can consider other factors when identifying the package retrieved by the associate. For example, the wearable detector may also compare the raw or instantaneous signal strength of the tags to each other, as well as the TNR values. For example, these two factors may be weighted.

In one embodiment, the location tracker compares the TNR values for each tag detected by a reader to a threshold to inventorize the tags within an area assigned to the reader. For example, using the method 600, the location tracker can determine TNR values for each tag within the read region of a reader. Rather than being mounted on a wearable detector that can move, the reader may be stationary like the readers in the RFID portals 110 illustrated in FIG. 1. The location tracker can use the TNR values to inventorize the tags to determine which of the tags are in the area assigned to the reader and which are in neighboring areas (e.g., neighboring loading zones or pallet storing areas). After deriving the TNR values for each tag, the location tracker can compare the values to a predetermined threshold to determine which tags are within the area assigned to the reader. For example, the tags with TNR values below the threshold are indicated as being disposed in neighboring areas while the tags with TNR values at or above the threshold are indicated as being within the area assigned to the reader.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
generating, using one or more computer processors, a first value based on a signal strength of signals received from a first radio frequency identification (RFID) tag at a first RFID reader during multiple read events;
determining a first average signal strength for a predefined period of time based on the first value;
generating a second value based on a signal strength of signals received from one of: (i) a plurality of RFID tags that excludes the first RFID tag at the first RFID reader and (ii) the first RFID tag at a second RFID reader;
determining a second average signal strength for the predefined period of time based on the second value;
generating a tag to noise ratio (TNR) value for the first RFID tag by dividing the first average signal strength by the second average signal strength; and
determining a physical location of the first RFID tag based on the TNR value.

2. The method of claim 1, wherein the second value is generated by measuring the signal strength of signals received from the plurality of RFID tags at the first RFID reader, the method further comprising:
determining that the first RFID tag is detected by the first RFID reader and a third RFID reader;
generating a different TNR value for the third RFID reader by dividing an average signal strength of signals received from the first RFID tag at the third RFID reader by an average signal strength of signals received from a plurality of RFID tags that excludes the first RFID tag at the third RFID reader; and
comparing the TNR values for the first and third RFID readers to determine the physical location of the first RFID tag.

3. The method of claim 1, wherein the second value is generated by measuring the signal strength of signals received from the first RFID tag at the second RFID reader during a plurality of read events, the method further comprising:
determining that the first RFID tag is detected by the first RFID reader and the second RFID reader;
determining a TNR value for the second RFID reader by comparing an average signal strength of signals received by the first RFID tag at the second RFID reader to the average signal strength of the signals received by the first RFID tag at the first RFID reader; and
comparing the TNR values for the first and second RFID readers to determine whether the physical location of the first RFID tag is within one of: a first area assigned to the first RFID reader and a second area assigned to the second RFID reader.

4. The method of claim 1, wherein the second value is generated by measuring the signal strength of signals received from the plurality of RFID tags at the first RFID reader, the method further comprising:
generating a different TNR value for a second RFID tag by dividing an average signal strength received from the second RFID tag at the first RFID reader by an average signal strength received from a plurality of RFID tags that excludes the second RFID tag at the first RFID reader; and
comparing the TNR values for the first and second RFID tags to identify a pick up event.

5. The method of claim 4, wherein the first RFID reader is contained in a wearable detector, wherein identifying the pick up event comprises:
determining that an associate wearing the wearable detector has picked up a first package containing the first RFID tag instead of a second package containing the second RFID tag based on comparing the TNR values for the first and second RFID tags.

6. The method of claim 1, wherein the second value is generated by measuring the signal strength of signals received from the plurality of RFID tags at the first RFID reader, the method further comprising:
  generating a plurality of TNR values for each of the plurality of RFID tags; and
  determining that the first RFID tag is in an area assigned to the first RFID reader and at least one of the plurality of RFID tags is outside the area by comparing the TNR value for the first RFID tag and the plurality of TNR values for the plurality of RFID tags to a predefined threshold.

7. A method, comprising:
  receiving, using a first RFID reader, RFID signals from a first RFID tag;
  determining a first parameter based the RFID signals received from the first RFID tag during multiple read events;
  determining a second parameter based on RFID signals received from at least one of: (i) a plurality of RFID tags that excludes the first RFID tag at the first RFID reader and (ii) the first RFID tag at a second RFID reader;
  generating a tag to noise ratio (TNR) value for the first RFID tag based on the first and second parameters; and
  determining a location of the first RFID tag based on the TNR value.

8. The method of claim 7, wherein the TNR value represents a difference between the RFID signals received from the first RFID tag and noise in an RFID environment, wherein the noise comprises one of: (i) the RFID signals received from the plurality of RFID tags that excludes the first RFID tag at the first RFID reader and (ii) the RFID signals received from the first RFID tag at the second RFID reader which is different from the first RFID reader.

9. The method of claim 7, wherein the first and second parameters comprise a measurement derived from at least one of: a signal strength of the received RFID signals, electrical angle of the received RFID signals, and received signal strength indication (RSSI) of the received RFID signals.

10. The method of claim 7, wherein the second parameter is based on RFID signals received from the plurality of RFID tags at the first RFID reader, the method further comprising:
  determining that the first RFID tag is detected by the first RFID reader and a third RFID reader;
  generating a different TNR value for the third RFID reader based on a third parameter derived from RFID signals received from the first RFID tag at the third RFID reader and a fourth parameter derived from RFID signals received from a plurality of RFID tags that excludes the first RFID tag at the third RFID reader; and
  comparing the TNR values for the first and third RFID readers to determine the location of the first RFID tag.

11. The method of claim 7, wherein the second parameter is based on RFID signals received from the first RFID tag at the second RFID reader, the method further comprising:
  determining that the first RFID tag is detected by the first RFID reader and the second RFID reader;
  determining a TNR value for the second RFID reader based on the RFID signals received from the first RFID tag at the second RFID reader and the RFID signals received from the first RFID tag at the first RFID reader; and
  comparing the TNR values for the first and second RFID readers to determine whether the location of the first RFID tag is within one of a first area assigned to the first RFID reader and a second area assigned to the second RFID reader.

12. The method of claim 7, wherein the second parameter is based on RFID signals received from the plurality of RFID tags at the first RFID reader, the method further comprising:
  generating a different TNR value for a second RFID tag based on a third parameter derived from RFID signals received from the second RFID tag at the first RFID reader and a fourth parameters derived from RFID signals received from a plurality of RFID tags that excludes the second RFID tag at the first RFID reader; and
  comparing the TNR values for the first and second RFID tags to determine whether the first RFID tag has been picked up, thereby changing the location of the first RFID tag.

13. The method of claim 12, wherein the first RFID reader is contained in a wearable detector, wherein determining whether the first RFID tag has been picked up comprises:
  determining that an associate wearing the wearable detector has picked up a first package containing the first RFID tag instead of a second package containing the second RFID tag based on comparing the TNR values for the first and second RFID tags.

14. The method of claim 7, wherein the second parameter is based on RFID signals received from the plurality of RFID tags at the first RFID reader, the method further comprising:
  generating a plurality of TNR values for each of the plurality of RFID tags; and
  determining that the first RFID tag is in an area assigned to the first RFID reader and at least one of the plurality of RFID tags is outside the area by comparing the TNR value for the first RFID tag and the plurality of TNR values for the plurality of RFID tags to a predefined threshold.

15. An RFID system comprising:
  a first RFID reader configured to received RFID signals from a first RFID tag,
  a location tracker configured to:
    determine a first parameter based the RFID signals received from the first RFID tag during multiple read events;
    determine a second parameter based on RFID signals received from one of: (i) a plurality of RFID tags that excludes the first RFID tag at the first RFID reader and (ii) the first RFID tag at a second RFID reader;
    generate a tag to noise ratio (TNR) value for the first RFID tag based on the first and second parameters; and
    determine a location of the first RFID tag based on the TNR value.

16. The RFID system of claim 15, wherein the first and second parameters comprise a measurement derived from at least one of: a signal strength of the received RFID signals, electrical angle of the received RFID signals, and received signal strength indication (RSSI) of the received RFID signals.

17. The RFID system of claim 15, wherein the second parameter is based on RFID signals received from the plurality of RFID tags at the first RFID reader, the location tracker is configured to:
  determine that the first RFID tag is detected by the first RFID reader and a third RFID reader;

generate a different TNR value for the third RFID reader based on a third parameter derived from RFID signals received from the first RFID tag at the third RFID reader and a fourth parameter derived from RFID signals received from a plurality of RFID tags that excludes the first RFID tag at the third RFID reader; and compare the TNR values for the first and third RFID readers to determine the location of the first RFID tag.

18. The RFID system of claim 15, further comprising:
the second RFID reader, wherein the second parameter is based on RFID signals received from the first RFID tag at the second RFID reader,
wherein the location tracker is configured to:
determine that the first RFID tag is detected by the first RFID reader and the second RFID reader;
determine a TNR value for the second RFID reader based on the RFID signals received from the first RFID tag at the second RFID reader and the RFID signals received from the first RFID tag at the first RFID reader; and
compare the TNR values for the first and second RFID readers to determine whether the location of the first RFID tag is within one of a first area assigned to the first RFID reader and a second area assigned to the second RFID reader.

19. The RFID system of claim 15, wherein the second parameter is based on RFID signals received from the plurality of RFID tags at the first RFID reader, the location tracker is configured to:
generate a different TNR value for a second RFID tag based on a third parameter derived from RFID signals received from the second RFID tag at the first RFID reader and a fourth parameters derived from RFID signals received from a plurality of RFID tags that excludes the second RFID tag at the first RFID reader; and
compare the TNR values for the first and second RFID tags to determine whether the first RFID tag has been picked up, thereby changing the location of the first RFID tag.

20. The RFID system of claim 15, further comprising:
a wearable detector comprising the first RFID reader, wherein, when determining whether the first RFID tag has been picked up, the location tracker is configured to:
determine that an associate wearing the wearable detector has picked up a first package containing the first RFID tag instead of a second package containing the second RFID tag based on comparing the TNR values for the first and second RFID tags.

* * * * *